United States Patent [19]

Oyama

[11] Patent Number: 4,620,269

[45] Date of Patent: Oct. 28, 1986

[54] HEADLAMP FOR VEHICLE

[75] Inventor: Hiroo Oyama, Sagamihara, Japan

[73] Assignee: Stanley Electric Co., Ltd., Tokyo, Japan

[21] Appl. No.: 759,651

[22] Filed: Jul. 26, 1985

[30] Foreign Application Priority Data

Aug. 3, 1984 [JP] Japan ................................ 59-163732

[51] Int. Cl.[4] ................................................ B60Q 1/04

[52] U.S. Cl. ....................................... 362/80; 362/301

[58] Field of Search .................... 362/61, 80, 257, 296, 362/297, 298, 299, 301, 303, 268, 300, 307, 311

[56] References Cited

U.S. PATENT DOCUMENTS 1,683,896 9/1928 Jacob .................................... 362/61

1,735,090 11/1929 Pollard ................................ 362/298

FOREIGN PATENT DOCUMENTS 691341 10/1930 France ................................ 362/298

*Primary Examiner*—Charles J. Myhre
*Assistant Examiner*—David A. Okonsky
*Attorney, Agent, or Firm*—Frishauf, Holtz, Goodman & Woodward

[57] ABSTRACT

A vehicle headlamp comprises a revolution paraboloidal reflector attached to the lower portion of a housing, facing in an upward direction, and a rectangular front lens located in front thereof. A lamp is located so that the position of the filament is at the focus of the revolution paraboloidal reflector. A front flat reflector is provided in front of the paraboloidal reflector and reflects the light beam therefrom toward the front lens with a reflecting angle of about 90°. A back flat reflector, mounted parallel to the front reflector, and pairs of flat side reflectors are provided to change the course of a part of the light beam toward the front lens, the resulting light distribution pattern on the front lens being substantially rectangular.

16 Claims, 12 Drawing Figures

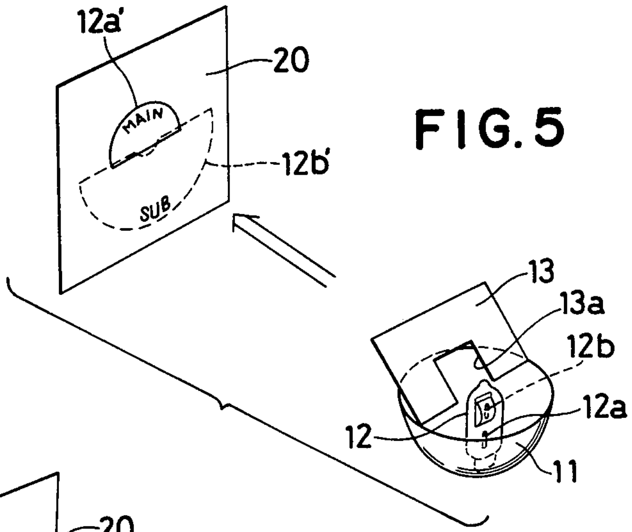
FIG. 5
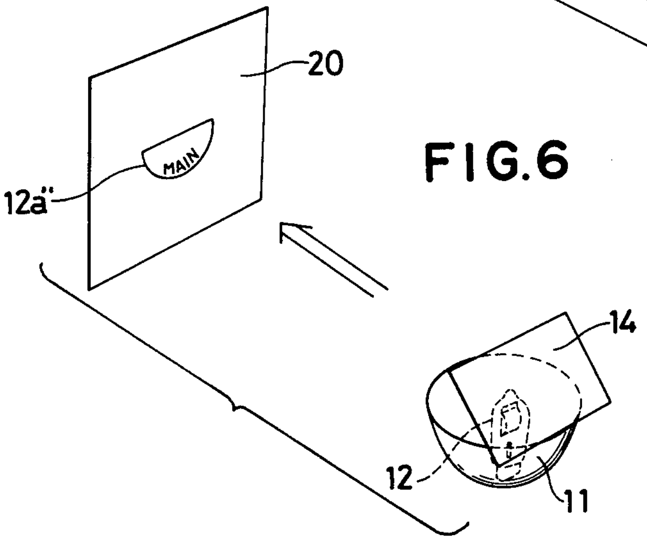
FIG. 6
FIG. 7
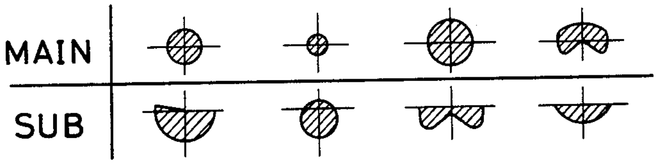

1 : 1.5

1 : 4

1 : 9

HEADLAMP FOR VEHICLE

BACKGROUND OF THE INVENTION

1. Field of the Invention

The present invention relates to a headlamp or a foglamp for a vehicle in which the illumination surface of the beam is a laterally extending rectangular shape.

2. Description of the Prior Art

A rectangular type headlamp, simply speaking, is designed to have a rectangular shape when it is viewed from the front side, by cutting the top, bottom, right and left sides of a circular shape headlamp.

This kind of rectangular shape headlamp comprises three parts; a portion from which a light is radiated (lamp), a paraboloidal reflector and a front lens. As shown in FIG. 8, if the rectangular portion 2 being inscribed within a circle is utilized, the remaining portions A, B, C, and D are not utilized for radiation area, resulting in a dark lamp.

In order to prevent this decrease of quantity of light, the rectangular shape headlamp is generally designed, as shown in FIG. 9, to use a larger circular reflector 4 than the conventional circular shape reflector 3, by utilizing the rectangular portion 5 being inscribed within the circle 4. According to this design, the loss of the light from the top and bottom sides of the reflector can be compensated with a beam from the oblique line portions of left and right sides (the light which is conventionally not necessary to use in the circular shape). Also, a halogen lamp having the same consumed electric power and being brighter than the others, (the light quantity is increased to 30 to 40%) is used to prevent the decrease of light quantity of the headlamp.

A rectangular shape headlamp, as shown in FIG. 10(*a*), having an aspect ratio of about 1:1.4 to 1:2, is recently being used in order to reduce the air resistance of the vehicle and to raise the fuel consumption rate. From the design requirement, it is required to form the headlamp shape to be more slender in the horizontal direction. For the headlamp formed by cutting the top, bottom, left and right sides of the circular shape headlamp, as shown in FIGS. 10(*b*) and (*c*), as the shape becomes more slender, the more the ratio of the volume escaping in the upper and lower directions to the total volume from the lamp increases. Thus, for a lamp having the same consumed electric power, the decrease of the light quantity increasingly becomes large. Designing the lamp more slender is considered to be a difficult problem because of the efficiency improvement of the halogen lamp being almost to its limit.

In many highly styled cars, a design is adopted in which the lamp is enclosed inside of the bonnet when not in use during daytime and it is raised out from the bonnet when in use at night. But, the increase of air resistance during night driving is inevitable for this kind of design. Also, the design in which a plurality of small rectangular shape headlamps are arranged in line forming a set of the headlamps has been studied, but this design has problem in a maintenance, etc.

OBJECT OF THE INVENTION

The main object of the present invention is to provide a headlamp for a vehicle in which the illumination surface is of slender rectangular shape and which has high beam utilization rate.

Another object of the present invention is to provide a headlamp for a vehicle in which a glare is not emitted from the inside of the headlamp, when it is viewed from the outside.

According to the present invention, a headlamp for a vehicle is characterized in that the lamp is located so that the position of the filament may be at a focus of the revolution paraboloidal reflector facing to the upward direction, a front flat reflector is provided in front of the above reflector and reflects the beam from the above reflector to the same direction with a reflection angle of 90°, and a back flat reflector and pairs of reflectors are provided to change the beam course of a part of the beam from the back flat reflector to the outside, which are provided in parallel, and lead the beam to enter into the laterally extending rectangular shape lens. In the above device, the upward reflected beam from the above revolution paraboloidal reflector is reflected with a right angle, forming the laterally extending illumination surface, and all of the beams from the revolution paraboloidal reflector are utilized, so the reduction of the illumination does not occur.

Further, since the above front flat reflector and the back flat reflector are enclosed and fixed inside the housing, a glare disappears when it is viewed from the outside by painting a dark color on the inside surface of the housing.

BRIEF DESCRIPTION OF THE DRAWINGS

FIG. 5 is a sketch for explaining the formation of the beam distribution pattern by the front flat reflector of the invention;

FIG. 6 is a sketch for explaining the formation of the beam distribution pattern by the back flat reflector of the invention;

FIG. 7 is a sketch which shows the various kinds of beam distribution patterns obtained by changing the combinations of the flat reflector of the invention;

DETAILED DESCRIPTION OF THE INVENTION

Figure 1:
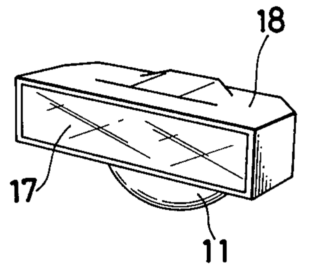
FIG. 1 is a perspective view of a headlamp of the present invention.
Figure 2:
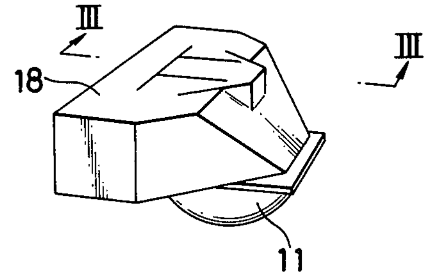
FIG. 2 is a rear perspective view thereof.
Figure 3:
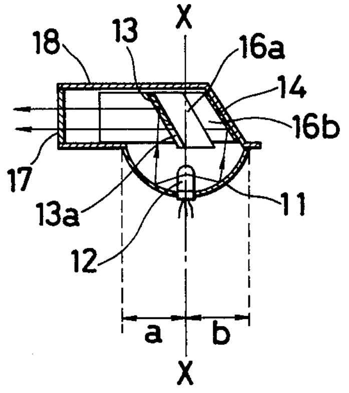
FIG. 3 is a cross sectional view along the line III—III line in FIG. 2.
Figure 4:
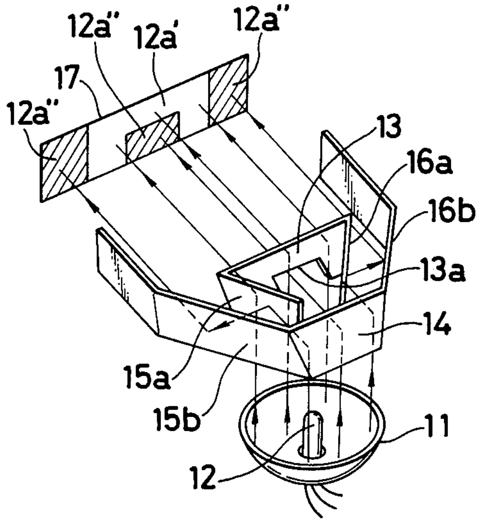
FIG. 4 illustrates the basis internal structure thereof.
Figure 8:
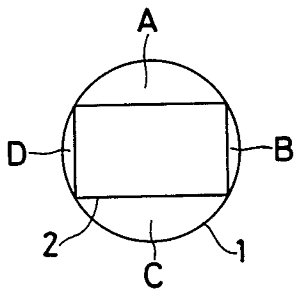
FIGS. 8 and 9 show the difference of the beam volume between a conventional circular type headlamp and a rectangular headlamp.
Figure 9:
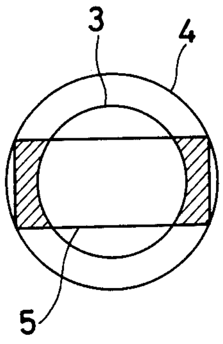
Figure 10A:
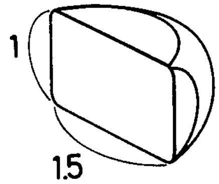
FIGS. 10(*a*), () and (*c*) are sketches which show the changes of the rectangular shape headlamp with variations in the aspect ratio.
Figure 10B:
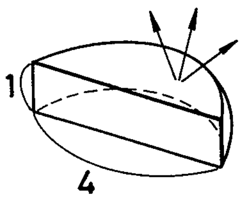
Figure 10C:
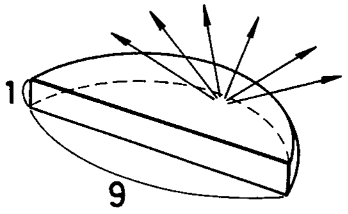

In FIGS. 1 to 3, 11 is the revolution paraboloidal reflector, 17 is the rectangular shape front lens and 18 is the housing. The above revolution paraboloidal reflector 11 is attached to the lower portion of the housing 18 such that the reflector faces to the upper direction and the lamp 12 is positioned so that the position of the filament of the lamp may be at or near focus of the revolution paraboloidal reflector 11. The beams emitted from the lamp 12 are reflected on the revolution paraboloidal reflector 11 and the beam courses are changed to the both sides of the front lens by pairs of flat reflectors. Namely, as shown in FIG. 4, the front flat reflector 13 and the back flat reflector 14, being inclined to about 45° respectively are provided above the revolution paraboloidal reflector. Both of the flat reflectors 13 and 14 are inclined to the same direction, and change the course of the beam from the above revolution paraboloidal reflector 11 with about a right angle toward the front lens 17. As seen in FIG. 3, the above front flat reflector reflects the portion "a" of light toward the front lens 17 from the center line X—X of the revolution paraboloidal reflector 11 and the back flat reflector 14 reflects the rearward portion "b" of the light.

Therefore, the front flat reflector 13 is mounted so that the reflecting surface faces the half area "a" of the paraboloidal reflector toward the front lens, and the back flat reflector 14 is mounted so that the reflecting surface faces the half area "b" toward the rear. Both flat reflectors 13 and 14 are fixed to the above housing. The front flat reflector 13, further, has a rectangular shape cut-out portion 13*a* at its lower center portion, through which a part of the beam reflected on the back flat reflector 14 proceeds to the front lens.

Above the paraboloidal reflector 11 are provided pairs of additional flat reflectors 15*a*, 15*b*, 16*a* and 16*b* which change the courses of a part of the beams from the back flat reflector 14 to the right and left sides. In this case, the flat reflectors 15*a* and 16*a* for changing the beam course located inside are connected to the both sides of the front flat reflector 13 respectively, and the flat reflectors 15*b* and 16*b* for changing the beam course located outside are connected to the both sides of the back flat reflector 14 respectively. By connecting the flat reflectors for changing the beam course to the front flat reflector 13 and the back flat reflector 14 respectively, fixing them to the housing 18 becomes easy and the production becomes also easy.

The beam distribution pattern for the front flat reflector 13 is as shown on the screen 20 in FIG. 5. In the case of the main beam filament 12*a* being lighted, the beam distribution pattern is 12*a*' on the screen 20, and for the case of the sub beam filament 12*b* being lighted, the beam distribution pattern is 12*b*' shown with the dotted line on the screen 20. The beam distribution pattern of the back flat reflector 14 is, as shown in FIG. 6, for the case of the main beam filament 12*a* being lighted, the pattern of 12*a*" on the screen 20. In the pattern 12*a*", a part of the beam reaches the front lens 17 through the cut-out portion 13*a* of the front flat reflector 13, and a part of the beam reaches the front lens 17 from the both sides of the back flat reflector 14 through the flat reflectors 15*a*, 15*b* and 16*a*, 16*b* for changing the beam course. In case of the main beam filament 12*a* being lighted, the beam reflected on the front flat reflector 13 takes the pattern 12*a*' on the front lens 17, and the beam reflected on the back flat reflector 14 becomes the pattern 12*a*' on the front lens. Therefore, the beam distribution pattern extends laterally and a rectangular shape illumination face can be obtained.

In the case of the sub beam filament 12*b* being lighted, since a hood is attached to the sub beam filament, the reflection at the half area "b" of the revolution paraboloidal reflector 11 does not exist, so the reflection on the back flat reflector 14 does not exist.

The above explanation is for the case of a vehicle headlamp. This device can be also applicable to a foglamp and rear combination lamp. By changing the combination of the front reflector, back flat reflector and the flat reflectors for changing the beam course, various kinds of beam distribution patterns can be obtained.

The housing 18 is formed of the resin, all inside surfaces are to be finished as non-reflective surfaces. The resin itself preferably has a dark color or is to be painted dark. Each of the flat reflectors in the housing can be fixed by bonding, etc. By finishing the inside of the housing to be non-reflective, or by painting the inside of the housing the same color as the car, most of the light from the outside can be absorbed on the non-reflective surface, the dark portion is recognized and there is no glare when it is viewed from the outside. Each flat reflector can be produced by the vacuum evaporation of a high brightness material such as aluminium on a suitable thick metal plate or a general cold mirror can be used.

In summary, according to the present invention, a circular type revolution paraboloidal reflector faces in the upward direction, and above the reflector flat reflectors are located to change the direction and the course of the beam from the paraboloidal reflector and to form a laterally extending beam distribution pattern which is directed towards the rectangular shaped front lens. Thus, a slender illumination surface can be obtained, and the front curved line can be freely designed in accordance with the car design. As for the lamp, either of the c-8/c-8 type and c-6/c-6 type is available. This device has the excellent advantage that the beam volume is more effectively utilized than the conventional type (direct illumination type) in the case of the same lens shape.

What is claimed is:

1. A vehicle lamp, comprising:

a housing having a front portion, a rear portion and a lower portion;

a revolution paraboloidal reflector attached to said lower portion of said housing and facing in the upward direction;

a laterally extending rectangular shaped front lens located in said front portion of said housing and facing in a direction substantially perpendicular to said paraboloidal reflector;

a lamp located so that the position of a filament thereof is at the focus of said revolution paraboloidal reflector, whereby light produced by said lamp is formed into an upwardly directed light beam by said paraboloidal reflector in the axial direction of said paraboloidal reflector;

a substantially flat front reflector mounted above said paraboloidal reflector in the axial direction of said paraboloidal reflector and reflecting a first portion of said light beam from said paraboloidal reflector toward said front portion of said housing with a reflecting angle of about 90° so that light reflected by said front reflector impinges said front lens;

a substantially flat back reflector mounted above said paraboloidal reflector in the axial direction of said paraboloidal reflector, and spaced rearwardly of said front reflector in a direction substantially perpendicular to said axial direction of said paraboloidal reflector, said back reflector being arranged to reflect a second portion of said light beam from said paraboloidal reflector toward said front portion of said housing with a reflecting angle of about 90° so that light reflected by said back reflector impinges said front lens; and two pairs of additional substantially flat reflectors mounted adjacent said front and back reflectors and on respective opposite sides of said front and back reflectors, for reflecting and changing the course of some of the light reflected by said back reflector to pass around said opposite sides of said front reflector and toward said front lens.

2. The vehicle lamp of claim 1, wherein said reflectors of each of said additional pairs of reflectors are mounted substantially in parallel with each other.

3. The vehicle lamp of claim 1, wherein said housing is formed of a synthetic resin, and wherein the inside surfaces of said housing are dark color.

4. The vehicle lamp of claim 1, wherein said housing is formed of a synthetic resin, and wherein the inside surfaces of said housing are non-reflective.

5. The vehicle lamp of claim 1, wherein said front flat reflector has a cut-out portion through which a part of the light beam reflected by said back flat reflector can pass.

6. The vehicle lamp of claim 1, wherein each of said flat reflectors is produced by vacuum evaporation of aluminum on a metal surface.

7. The vehicle lamp of claim 1, wherein each of said flat reflectors comprises a cold mirror.

8. The vehicle lamp of claim 1, wherein said front and back reflectors are mounted substantially in parallel with each other.

9. The vehicle lamp of claim 8, wherein said reflectors of each of said additional pairs of reflectors are mounted substantially in parallel with each other.

10. The vehicle lamp of claim 8, wherein said front flat reflector has a cut-out portion through which a part of the light beam reflected by said back flat reflector can pass.

11. The vehicle lamp of claim 8, wherein a first reflector of each of said pairs of reflectors is connected to respective opposite sides of said front reflector, and wherein a second reflector of each of said pairs of additional reflectors is connected to a respective opposite side of said back reflector.

12. The vehicle lamp of claim 11, wherein said front reflector is integrally formed with said first additional reflectors, and said back reflector is integrally formed with said second additional reflectors.

13. The vehicle lamp of claim 11, wherein said front flat reflector has a cut-out portion through which a part of the light beam reflected by said back flat reflector can pass.

14. The vehicle lamp of claim 1, wherein a first reflector of each of said pairs of reflectors is connected to respective opposite sides of said front reflector, and wherein a second reflector of each of said pairs of additional reflectors is connected to a respective opposite side of said back reflector.

15. The vehicle lamp of claim 14, wherein said front reflector is integrally formed with said first additional reflectors, and said back reflector is integrally formed with said second additional reflectors.

16. The vehicle lamp of claim 14, wherein said front flat reflector has a cut-out portion through which a part of the light beam reflected by said back flat reflector can pass.

* * * * *